United States Patent
Reicheneder et al.

[15] 3,671,525
[45] June 20, 1972

[54] PYRIDAZONIUM COMPOUNDS

[72] Inventors: Franz Reicheneder; Rudolf Kropp, both of Ludwigshafen, Germany

[73] Assignee: Badische Anilin- & Soda-Fabrik Aktiengesellschaft, Ludwigshafen/Rhine, Germany

[22] Filed: March 11, 1970

[21] Appl. No.: 18,692

[30] Foreign Application Priority Data

March 15, 1969    Germany...............P 19 13 265.1

[52] U.S. Cl. ..............................260/250 A, 424/250, 71/92
[51] Int. Cl. ........................................................C07d 51/04
[58] Field of Search ..............................................260/250 A

[56] References Cited

UNITED STATES PATENTS 3,157,646   11/1964    Reicheneder et al...................260/250

*Primary Examiner*—Nicholas S. Rizzo
*Attorney*—Johnston, Root, O'Keeffe, Keil, Thompson & Shurtleff

[57] ABSTRACT

The production of 2-alkylpyridazonium compounds by reaction of pyridazones-(6) with alkylating agents, and the new 2-alkylpyridazonium compounds. The compounds which can be prepared by the process according to the invention are pharmaceuticals and valuable starting materials for the production of dyes, pharmaceuticals and pesticides.

2 Claims, No Drawings

PYRIDAZONIUM COMPOUNDS

The invention relates to a process for the production of 2-alkylpyridazonium compounds by reaction of pyridazones-(6) with alkylating agents, and to new substances of this type.

It is an object of this invention to provide a new process for the production of 2-alkylpyridazonium compounds by a simple and economical method and in good yields and high purity.

Another object of the invention is the new 2-alkylpyridazonium compounds.

These and other objects of the invention are achieved and 2-alkylpyridazonium compounds having the general formula:

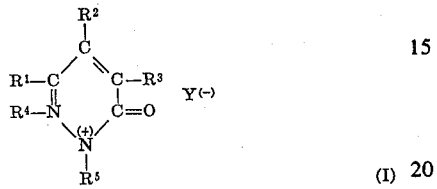

in which $R^1$, $R^2$ and $R^3$ are identical or different and each denotes a halogen atom, an aliphatic radical, the radical

(in which the individual radicals $R^6$ may be identical or different and each denotes a hydrogen atom, an aliphatic, cycloaliphatic, araliphatic or aromatic radical or together with the adjacent nitrogen atom forms a heterocyclic ring), an alkoxy group, a hydroxy group, a phenoxy group, an alkylthio group, a phenylthio group, $R^1$ may also denote a hydrogen atom or an aromatic radical and/or $R^2$ may also denote a hydrogen atom, $R^2$ and $R^3$ together with the carbon atoms adjacent thereto may also denote members of a ring, $R^4$ denotes an alkyl group, $R^5$ denotes an aliphatic, cycloaliphatic, araliphatic or aromatic radical and Y denotes a halogen atom, the radical $-OSO_2R^7$ (in which $R^7$ denotes an aromatic radical), the radical $BF_4$ or the radical $$-OSO_2\!-\!OR^4$$

(in which $R^4$ has the above meaning) are advantageously obtained by reacting a pyridazone-(6) having the general formula:

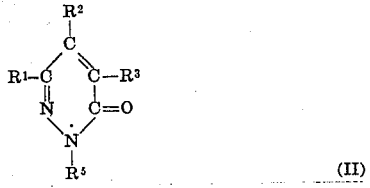

in which $R^1$, $R^2$, $R^3$ and $R^5$ have the meanings given above, with an alkylating agent having the general formula:

$$R^8\!-\!Y \qquad (III)$$

in which $R^8$ has the meaning given above for $R^4$ and may also denote the radical $$[(R^4)_3O]^{(+)}$$

and Y has the meaning given above.

When 1-phenyl-4-amino-5-chloropyridazone-(6) and dimethyl sulfate are used, the reaction may be represented by the following equation:

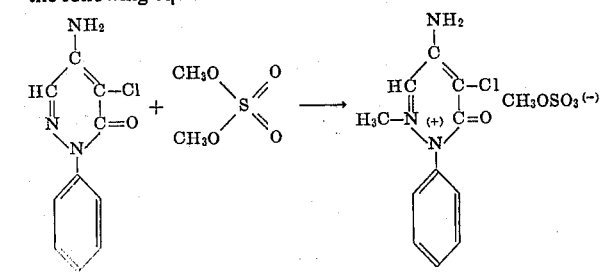

The process according to the invention provides a large number of new pyridazonium compounds by a simple and economical method, in good yields and high purity.

The pyridazones-(6) used as starting materials and having the general formula (II) may be prepared by conventional methods, for example from hydrazines by the methods described in Angew. Chem., vol. 77 (1965), pp. 282 et seq. Preferred starting materials (II) are those in whose formulas $R^1$, $R^2$ and $R^3$ may be identical or different and each denotes a chlorine atom, a bromine atom, an alkyl radical having one to six carbon atoms, an alkyl radical having one to four carbon atoms and being substituted by a five-membered or six-membered heterocyclic ring having one or two nitrogen atoms or one oxygen atom, the radical

(in which the individual radicals $R^6$ may be identical or different and each denotes a hydrogen atom, an acyl radical, particularly an alkylcarbonyl radical having one to four carbon atoms, an alkyl radical having one to four carbon atoms, a cyclohexyl radical, an aralkyl radical having seven to 10 carbon atoms or a phenyl radical or together with the adjacent nitrogen atom forms a five-membered or six-membered heterocyclic ring) a hydroxy group, an alkylthio group or an alkoxy group in each case having one to four carbon atoms, a phenoxy group or a phenylthio group, $R^1$ may also denote a hydrogen atom or a phenyl radical and/or $R^2$ may also denote a hydrogen atom, $R^2$ and $R^3$ together with the carbon atoms adjacent thereto may also denote members of a five-membered or six-membered ring which, in addition to carbon atoms, may contain one or two nitrogen atoms or one oxygen atom and/or one or two further double bonds, $R^5$ denotes an alkyl radical having one to 12 carbon atoms, a cycloalkyl radical having five to eight carbon atoms, an aralkyl radical having seven to ten carbon atoms or a phenyl radical. In the preferred end products (I), $R^4$ denotes an alkyl group having one to three carbon atoms and Y denotes a chlorine atom, a bromine atom, an iodine atom, the radical $-OSO_2R^7$, $R^7$ denoting a phenyl or tolyl radical, the radical $BF_4$ or the radical

$R^4$ having the above preferred meaning. The said radicals may also bear, as substituents, groups and/or atoms which are inert under the reaction conditions, for example chlorine atoms, bromine atoms, fluorine atoms, alkoxy groups having one to four carbon atoms, hydroxy groups, alkyl groups having one to four carbon atoms, and amino groups. Unsubstituted amino or imidazole groups may be substituted by a further alkyl group in the reaction.

The following pyridazones-(6) may for example be used as starting materials (II):

1-phenyl-4-methoxy-5-chloropyridazone-(6), and the corresponding 5-bromo-,
1-(p-tolyl) and 1-methyl compounds,
1-phenyl-4-dibenzylamino-5-chloropyridazone-(6),
1-phenyl-4-hydroxy-5-chloropyridazone-(6),
1-isopropyl-4-amino-5-chloropyridazone-(6),
1-phenyl-4-dimethylamino-5-chloropyridazone-(6),
1-methyl-4-anilino-5-bromopyridazone-(6),
1-phenyl-4,5-dimethoxypyridazone-(6),
1-phenyl-4-bromo-5-aminopyridazone-(6),
1-phenyl-4-phenylthio-5-aminopyridazone-(6),
1-phenyl-3-chloro-5-aminopyridazone-(6) and the corresponding 3-ethyl and 3-phenyl compounds,
1-phenyl-4,5-benzopyridazone-(6) and
1-phenyl-4,5-imidazolo-(4',5')-pyridazone-(6).

Preferred alkylating agents having the general formula (III) are those in whose formula $R^8$ denotes an alkyl radical having one to three carbon atoms or the radical $(R^4)_3O^{(+)}$ in which $R^4$ has the said meaning, and Y denotes a chlorine atom, bromine atom, iodine atom, the radical $-OSO_2-R^7$ (in which $R^7$ denotes a phenyl or tolyl radical which may bear, as substituent, one of the said atoms and/or groups which are inert under reaction conditions), the radical $BF_4$, or the radical

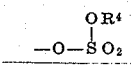

in which $R^4$ has the said meaning. The starting material (III) is used in a stoichiometric amount with reference to starting material (II) or in excess, for example in an excess of up to thirty times. The following starting materials (III) may for example be used: methyl chloride, ethyl chloride, propyl chloride, methyl bromide, ethyl bromide, propyl bromide, dimethyl sulfate, dipropyl sulfate, diethyl sulfate, the methyl, ethyl or propyl ester of benzenesulfonic acid, toluenesulfonic acid, 2,5-dimethylbenzenesulfonic acid, 4-chlorobenzenesulfonic acid or 4-methoxybenzenesulfonic acid, trimethyloxonium tetrafluoborate or triethyloxonium tetrafluoborate.

The reaction is generally carried out at a temperature of from 0° to 220° C, preferably from 60° to 160° C, at atmospheric or superatmospheric pressure, continuously or batchwise. It is advantageous to use in the reaction a solvent which is inert under the reaction conditions, for example a hydrocarbon such as ligroin or cyclohexane, an aromatic hydrocarbon such as benzene, xylene or nitrobenzene; a chlorohydrocarbon such as chlorobenzene or carbon tetrachloride; an ether such as dioxan or tetrahydrofuran or diethyl ether; a ketone such as acetone or cyclohexanone; a nitrile such as acetonitrile; an ester such as ethyl acetate or butyl acetate; or mixtures of these solvents.

The reaction may be carried out as follows: starting material II, with or without the solvent, has starting material III added to it at the reaction temperature and while mixing well. The mixture is then kept for another half hour to three hours at reaction temperature. The end product is then separated from the mixture by a conventional method, for example by filtration; by evaporation of the mixture, treatment of the residue with one of the said solvents and filtration; by extraction with a suitable solvent, for example water, and removal of the solvent. In the case of substances which do not crystallize well, the end product may for example by converted by means of perchloric acid into the perchlorate which crystallizes well, or in an analogous manner into the chloride, bromide, iodide or tetrafluoborate.

The new compounds which can be prepared by the process of the invention are pharmaceuticals and valuable starting materials for the production of dyes, pharmaceuticals and pesticides. Some of them are effective agents for influencing the central nervous system, against pathogenic fungi and against pathogenic bacteria. Thus the end product in Example 9 has a good action on Staphylococcus aureus, Streptococcus faecalis and Escherichia coli in a concentration of only 1 : 100,000 to 1 : 10,000. The end product specified in Example 10 also has a very good action on Epidermophyton glocosum in a concentration of only 1 : 100,000 to 1 : 10,000.

The following examples illustrate the invention. The parts specified in the following examples are by weight.

EXAMPLE 1

Eleven parts of 1-phenyl-4-amino-5-chloropyridazone-(6) is suspended in 200 parts of xylene, and 10 parts of dimethyl sulfate is added. The mixture is stirred for 3 hours at 130° C. The mixture is then filtered. Fifteen parts (86.5 percent of the theory with reference of the starting material (II) reacted) of 1-phenyl-2-methyl-4-amino-5-chloropyridazonium methosulfate ($C_{12}H_{14}O_5N_3SCl$) is obtained. It is insoluble in xylene. Melting point 187° to 188° C after having been washed with tetrahydrofuran.

EXAMPLE 2

The reaction is carried out analogously to Example 1 but using 13 parts of 1-phenyl-4-amino-5-bromopyridazone-(6) and 9.5 parts of dimethyl sulfate. Thirteen parts (66.4 percent of the theory) of 1-phenyl-2-methyl-4-amino-5-bromopyridazonium methosulfate ($C_{12}H_{14}O_5N_3SBr$) is obtained. It has a melting point of 183° to 184° C after having been recrystallized from methanol.

EXAMPLE 3

The reaction is carried out analogously to Example 1 but using 11.6 parts of 1-phenyl-4,5-dimethoxypyridazone-(6) and 9.5 parts of dimethyl sulfate. Thirteen parts (72.3 percent of the theory) of 1-phenyl-2-methyl-4,5-dimethoxypyridazonium methosulfate ($C_{14}H_{18}O_7N_2S$) is obtained. It has a melting point of 102° to 104° C after having been recrystallized from isopropanol.

EXAMPLE 4

The reaction is carried out analogously to Example 1 but using 13.15 parts of 1-phenyl-4-acetylamino-5-chloropyridazone-(6) and 9.5 parts of dimethyl sulfate. 2.9 parts of 1-phenyl-2-methyl-4-acetylamino-5-chloropyridazonium methosulfate ($C_{14}H_{16}O_6N_3SCl$) is obtained. It has a melting point of 195° to 196° C after having been recrystallized from methanol. Ten parts of unreacted starting material (II) is recovered from the xylene solution. The yield is 62.2 percent of the theory with reference to starting material (II) reacted.

EXAMPLE 5

The reaction is carried out analogously to example 1 but using 14.75 parts of 1-phenyl-4-ethylamino-5-bromopyridazone-(6) and 9.5 parts of dimethyl sulfate. 19 parts of the end product (I) is obtained in the form of an oil which is insoluble in xylene. This oil is dissolved in water, and 10 parts of a 70 percent by weight aqueous perchloric acid solution is added. 17 parts (83.4 percent of the theory) of 1-phenyl-2-methyl-4-ethylamino-5-bromopyridazonium perchlorate ($C_{13}H_{15}O_5N_3ClBr$) is obtained. It has a melting point of 98° to 100° C after having been recrystallized from water.

EXAMPLE 6

The reaction is carried out analogously to Example 1 but using 14.05 parts of 1-phenyl-4-methoxy-5-bromopyridazone-(6) and 9.5 parts of dimethyl sulfate. 18.5 parts of end product (I) is obtained in the form of an oil which is treated with 50 parts of water and 10 parts of 70 percent by weight perchloric acid analogously to Example 5. 16.8 parts (84.1 percent of the theory) of 1-phenyl-2-methyl-4-methoxy-5-bromopyridazonium perchlorate ($C_{12}H_{12}O_6N_2ClBr$ is obtained. The melting point is 127° to 129° C after recrystallization from water.

EXAMPLE 7

The reaction is carried out analogously to Example 1 but using 1-phenyl-5-aminopyridazone-(6) and 8 parts of dimethyl sulfate. Nine parts (76.8 percent of the theory) of 1-phenyl-2-methyl-5-aminopyridazonium methosulfate ($C_{12}H_{15}O_5N_3S$) is obtained. Its melting point is 118° to 120° C after recrystallization from alcohol.

EXAMPLE 8

The reaction is carried out analogously to Example 1 but using 20 parts of 1-phenyl-4,5-diaminopyridazone-(6) and 15 parts of methyl p-toluenesulfonate. 35 parts (90 percent of the theory) of 1-phenyl-2-methyl-4,5-diaminopyridazonium-p-toluenesulfonate ($C_{18}H_{20}N_4O_4S$) is obtained. It has a melting point of 238° to 240° C after recrystallization from water.

EXAMPLE 9

The reaction is carried out analogously to Example 1 but using 11.1 parts of 1-phenyl-4,5-benzopyridazone-(6) and 10 parts of dimethyl sulfate. Fifteen parts of end product (I) is obtained in the form of an oil which is treated analogously to Example 5 with 100 parts of water an 10 parts of 70 percent by weight perchloric acid. 12.2 parts (72.6 percent of the theory) of 1-phenyl-2-methyl-4,5-benzopyridazonium perchlorate is obtained. Its melting point is 243° to 244° C after recrystallization from water.

EXAMPLE 10

The reaction is carried out analogously to Example 1 but using 10.6 parts of 1-phenyl-[4,5]-7H-imidazolo-(4',5')-pyridazone-(6) and 3.5 parts of dimethyl sulfate. 16 parts (94.7 percent of the theory) of 1-phenyl-2-methyl-[4,5]-7-methylimidazole-(4',5')-pyridazonium methosulfate ($C_{13}H_{14}O_5N_4S$) is obtained. Its melting point is 205° to 207° C after recrystallization from alcohol.

EXAMPLE 11

The reaction is carried out analogously to Example 1 but using 11 parts of 1-phenyl-3-chloro-5-aminopyridazone-(6) and 10 parts of dimethyl sulfate. 15 parts of end product (I) is obtained in the form of an oil which is treated analogously to Example 5 with 70 parts of water and 10 parts of 70 percent by weight of perchloric acid. 12.8 parts (76.3 percent of the theory) of 1-phenyl-2-methyl-3-chloro-5-aminopyridazonium perchlorate ($C_{11}H_{11}O_5N_3Cl_2$) is obtained. It has a melting point of 220° C (decomposes) after recrystallization from water.

EXAMPLE 12

The reaction is carried out analogously to Example 1 but using 6 parts of 1-phenyl-4-amino-5-(N-piperidino)-methyl-pyridazone-(6) and 5 parts of dimethyl sulfate. 5.2 parts (60 percent of the theory) of 1-phenyl-2-methyl-4-amino-5-(N-piperidino)-methylpyridazonium methosulfate ($C_{18}H_{26}O_5N_4S$) is obtained. It has a melting point of about 260° C after it has been washed with acetonitrile. The perchlorate melts at 210° C.

EXAMPLE 13

20 parts of 1-phenyl-4,5-diaminopyridazone-(6) is heated at 100° C for three hours with 23 parts of diethyl sulfate in 300 parts of dioxan. The dioxan is then distilled off and the residue which remains is treated with acetonitrile and filtered. 30 parts (84.3 percent of the theory) of 1-phenyl-2-ethyl-4,5-diaminopyridazonium ethosulfate ($C_{14}H_{20}N_4O_5S$) is obtained. It has a melting point of 163° to 166° C.

EXAMPLE 14

The reaction is carried out analogously to Example 1 but using 23.5 parts of p-tolyl-4-amino-5-chloropyridazone-(6) and 20 parts of dimethyl sulfate. 31 parts of end product (I) is obtained in the form of an oil which is treated analogously to Example 5 with 200 parts of water and 20 parts of 70 percent by weight perchloric acid. 28 parts (80.7 percent of the theory) of 1-tolyl-2-methyl-4-amino-5-chloropyridazonium perchlorate ($C_{12}H_{13}O_5N_3Cl_2$) is obtained. It has a melting point of 245° to 246° C after recrystallization from water.

EXAMPLE 15

The reaction is carried out ananlogously to Example 1 but using 8 parts of 1-methyl-4-amino-5-chloropyridazone-(6) and 9.5 parts of dimethyl sulfate. 10 parts (70 percent of the theory) of 1,2-dimethyl-4-amino-5-chloropyridazonium methosulfate ($C_7H_{12}O_5N_3SCl$) is obtained. It has a melting point of 190° to 191° C after recrystallization from methanol.

EXAMPLE 16

The reaction is carried out analogously to Example 13 but using 18.7 parts of 1-isopropyl-4-amino-5-chloropyridazone-(6) and 20 parts dimethyl sulfate. The residue is treated with ethyl acetate. 24 parts (76.6 percent of the theory) of 1-isopropyl-2-methyl-4-amino-5-pyridazonium methosulfate ($C_9H_{16}ON_3SCl$) is obtained. It has a melting point of 70° to 80° C.

EXAMPLE 17

The reaction is carried out analogously to Example 1 but using 25 parts of 1-phenyl-4-diethyl-amino-5-chloropyridazone-(6) and 20 parts of dimethyl sulfate. 31 parts of end product (I) is obtained in the form of an oil which is treated analogously to Example 5 with 100 parts of water and 20 parts of 70 percent by weight perchloric acid. Twenty nine parts (82 percent of the theory) of 1-phenyl-2-methyl-4-diethylamino-5-chloropyridazonium perchlorate is obtained having a melting point of 152° to 154° C.

EXAMPLE 18

The reaction is carried out analogously to Example 1 but using 13 parts of 1-phenyl-4-bromo-5-aminopyridazone-(6) and 12 parts of dimethyl sulfate. 5 parts of unreacted starting material (II) is obtained and also 10 parts (83 percent of the theory with reference to reacted starting material (II)) of 1-phenyl-2-methyl-4-bromo-5-aminopyridazonium methosulfate ($C_{12}H_{14}O_5N_3SBr$) which has a melting point of 216° to 220° C after recrystallization from acetonitrile. The perchlorate melts at 250° to 251° C after recrystallization from water.

EXAMPLE 19

The reaction is carried out analogously to Example 1 but using 15 parts of 1-phenyl-4-phenylthio-5-aminopyridazone-(6). Fifteen parts of end product (I) is obtained in the form of an oil which is insoluble in xylene. This oil is dissolved in 100 parts of water, 15 parts of a 70 percent by weight perchloric acid is added and the product is filtered. Thirteen parts (63.4 percent of the theory) of 1-phenyl-2-methyl-4-phenylthio-5-aminopyridazonium perchlorate ($C_{17}H_{16}O_5N_3SCl$) is obtained which has a melting point of 199° to 201° C after recrystallization from water.

EXAMPLE 20

The reaction is carried out analogously to Example 1 but 11.5 parts of 1-phenyl-3-ethyl-5-methylaminopyridazone-(6) is used. Fifteen parts of end product (I) is obtained in the form of an oil which is insoluble in xylene. It is dissolved in 100 parts of water and 15 parts of a 70 percent by weight perchloric acid is added to it. The product is filtered. 12.5 parts (72.5 percent of the theory) of 1-phenyl-2-methyl-3-ethyl-5methylaminopyridazonium perchlorate ($C_{14}H_{18}O_5N_3Cl$) is obtained. It has a melting point of 155° to 160° C after recrystallization from water.

EXAMPLE 21

The reaction is carried out analogously to Example 1 but using 20 parts of 1-phenyl-4-amino-5-hydroxypyridazone-(6) and 20 parts of dimethyl sulfate. 18 parts of end product (I) is obtained in the form of an oil which is insoluble in water and which is dissolved in 50 parts of water. 10 parts of a 70 percent by weight perchloric acid is then added. Thirteen parts (39.2 percent of the theory) of 1-phenyl-2-methyl-4-methylamino-5-hydroxypyridazonium perchlorate is obtained which has a melting point of 142° to 145° C after recrystallization from water.

EXAMPLE 22

The reaction is carried out analogously to Example 1 but using 28 parts of 1-methyl-4-anilino-5-bromopyridazone-(6) and 20 parts of dimethyl sulfate. 33 parts of end product (I) is obtained in the form of an oil which is insoluble in xylene and which is dissolved in water. 20 parts of a 70 percent by weight perchloric acid is added to it. 31 parts (78.5 percent of the theory) of 1,2-dimethyl-4-anilino-5-bromopyridazonium perchlorate is obtained which has a melting point of 178° to 180° C.

EXAMPLE 23

The reaction is carried out analogously to Example 1 but using 21.7 parts of 1-phenyl-4-amino-5-methoxypyridazone-(6) and 20 parts of dimethyl sulfate. 25 parts of end product (I) is obtained in the form of an oil which is insoluble in xylene and which is dissolved in 100 parts of water. Fifteen parts of a 70 percent by weight perchloric acid is added to it. 22 parts (66.4 percent of the theory) of 1-phenyl-2-methyl-4-amino-5-methoxypyridazonium perchlorate is obtained having a melting point of 205° to 206° C.

EXAMPLE 24

The reaction is carried out analogously to Example 1 but using 27.7 parts of 1,3-diphenyl-5-methylaminopyridazone-(6) and 20 parts of dimethyl sulfate. 32.5 parts of end product (I) is obtained in the form of an oil which is insoluble in xylene and which is dissolved in water. 15 parts of a 70 percent by weight perchloric acid is added to it. 30 parts (76.7 percent of the theory) of 1,3-diphenyl-2-methyl-5-methylaminopyridazonium perchlorate is obtained having a melting point of 200° to 205° C after recrystallization from alcohol.

EXAMPLE 25

The reaction is carried out analogously to Example 1 but using 28 parts of 1-phenyl-3-ethyl-5-piperidino pyridazone-(6) and 20 parts of dimethyl sulfate. 34.8 parts of end product (I) is obtained in the form of an oil which is insoluble in xylene and which is dissolved in 100 parts of water. Fifteen parts of a 70 percent by weight perchloric acid is added to it. 32.9 parts (82.9 percent of the theory) of 1-phenyl-2-methyl-3-ethyl-5-piperidinopyridazonium perchlorate is obtained. It has a melting point of 128° to 130° C after recrystallization from alcohol.

EXAMPLE 26

The reaction is carried out analogously to Example 1 but using 10 parts of 1-methyl-3-methoxy-4-methylamino-5-chloropyridazone-(6) and 20 parts of dimethyl sulfate. 11 parts of end product (I) is obtained in the form of an oil which is insoluble in xylene and which is dissolved in 50 parts of water. 10 parts of a 70 percent by weight perchloric acid is added to it. 9.6 parts (60.3 percent of the theory) of 1,2-dimethyl-3-methoxy-4-methylamino-5-chloropyridazonium perchlorate is obtained. It has a melting point of 148° to 150° C after it has been washed with ethyl acetate.

EXAMPLE 27

The reaction is carried out analogously to Example 1 but using 11.1 parts of 1-phenyl-4-hydroxy-5-chloropyridazone-(6) and 20 parts of dimethyl sulfate. Fifteen parts of end product (I) is obtained in the form of an oil which is insoluble in xylene. It is dissolved in 80 parts of hot water. During cooling, 14.5 parts (80.6 percent of the theory) of 1-phenyl-2-methyl-4-hydroxy-5-chloropyridazonium methosulfate ($C_{12}H_{13}O_5N_2SCl.H_2O$) crystallizes out. It has a melting point of 112° to 113° C after recrystallization from acetonitrile.

EXAMPLE 28

14.3 parts of 1-methyl-4,5-dichloropyridazone-(6) is dissolved in 100 parts of toluene and well mixed with 16.5 parts of triethyl oxonium tetrafluoborate for two hours at 100° C. five parts (21.2 percent of the theory) of 1-methyl-2-ethyl-4,5-dichloropyridazonium tetrafluoborate separates out. It melts at 118° to 123° C after it has been washed with ethyl acetate. The perchlorate has a melting point of 132° to 134° C.

We claim:
1. 1-phenyl-2-methyl-4,5-benzopyridazonium perchlorate.
2. 1-phenyl-2-methyl-[4,5]-7-methylimidazole-(4',5')-pyridazonium methosulfate.

* * * * *

PO-1050
(5/69)

UNITED STATES PATENT OFFICE
CERTIFICATE OF CORRECTION

Patent No. 3,671,525  Dated June 20, 1972

Inventor(s) Franz Reicheneder et al.

It is certified that error appears in the above-identified patent and that said Letters Patent are hereby corrected as shown below:

Column 4 line 22, "$(C_{14}H_{16}O_6N_3SCl$" should read -- $(C_{14}H_{16}O_6N_3SCl)$ --; line 37, "$(C_{13}H_{15}O_5N_3ClBr$" should read -- $(C_{13}H_{15}O_5N_3ClBr)$ --; line 49, "$(C_{12}H_{12}O_6N_2ClBr$" should read -- $(C_{12}H_{12}O_6N_2ClBr)$ --. Column 6, line 29, "5methylaminopyridazonium" should read -- 5-methylaminopyridazonium --.

Signed and sealed this 27th day of February 1973.

(SEAL)
Attest:

EDWARD M. FLETCHER, JR.
Attesting Officer

ROBERT GOTTSCHALK
Commissioner of Patents